United States Patent
Miyaoka

(10) Patent No.: US 10,664,503 B2
(45) Date of Patent: May 26, 2020

(54) INFORMATION PROVIDING SYSTEM, INFORMATION PROVIDING METHOD, AND NON-TRANSITORY RECORDING MEDIUM FOR COLLECTING INFORMATION RELATED TO EVENTS AND SITUATIONS AT VARIOUS POSITIONS IN THE REAL WORLD AND PROVIDING THE COLLECTED INFORMATION, WITH INFORMATION ABOUT THE VARIOUS POSITIONS, TO A USER

(71) Applicant: TOYOTA JIDOSHA KABUSHIKI KAISHA, Toyota-shi, Aichi-ken (JP)

(72) Inventor: Saeko Miyaoka, Tokyo (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/994,627

(22) Filed: May 31, 2018

(65) Prior Publication Data
US 2019/0018859 A1    Jan. 17, 2019

(30) Foreign Application Priority Data

Jul. 11, 2017 (JP) ................................. 2017-135697

(51) Int. Cl.
| G06F 16/29 | (2019.01) |
| G06Q 30/02 | (2012.01) |
| G06Q 50/10 | (2012.01) |
| G06F 16/2457 | (2019.01) |

(52) U.S. Cl.
CPC ........ *G06F 16/29* (2019.01); *G06F 16/24578* (2019.01); *G06Q 30/0261* (2013.01); *G06Q 50/10* (2013.01)

(58) Field of Classification Search
None
See application file for complete search history.

(56) References Cited

U.S. PATENT DOCUMENTS

| 2010/0223581 | A1* | 9/2010 | Manolescu | ............ G06Q 10/00 |
| | | | | 715/853 |
| 2011/0289454 | A1 | 11/2011 | Houllier et al. | |
| 2015/0078632 | A1* | 3/2015 | Hachisuka | ......... G06K 9/00308 |
| | | | | 382/118 |
| 2017/0205240 | A1* | 7/2017 | Nakamura | ............. A61B 5/165 |
| 2017/0336217 | A1* | 11/2017 | Sueyoshi | ............... G01C 21/26 |

FOREIGN PATENT DOCUMENTS

| JP | 2012509534 A | 4/2012 |
| JP | 2016192028 A | 11/2016 |
| WO | 2010058134 A1 | 5/2010 |

* cited by examiner

Primary Examiner — Jason A Pringle-Parker
(74) Attorney, Agent, or Firm — Hunton Andrews Kurth LLP

(57) ABSTRACT

An information providing system includes a circuitry configured to: collect sensing information from a vehicle, the sensing information being acquired at an arbitrary position by the vehicle; collect feeling information indicating a people's feeling about an arbitrary position; and cause a display mounted on a mobile terminal or a target vehicle to display a map image and to display each of at least a part of the sensing information and at least a part of the feeling information at a corresponding position in the map image, the feeling information being related to an acquisition position at which the sensing information was acquired by the vehicle.

18 Claims, 6 Drawing Sheets

INFORMATION PROVIDING SYSTEM, INFORMATION PROVIDING METHOD, AND NON-TRANSITORY RECORDING MEDIUM FOR COLLECTING INFORMATION RELATED TO EVENTS AND SITUATIONS AT VARIOUS POSITIONS IN THE REAL WORLD AND PROVIDING THE COLLECTED INFORMATION, WITH INFORMATION ABOUT THE VARIOUS POSITIONS, TO A USER

INCORPORATION BY REFERENCE

The disclosure of Japanese Patent Application No. 2017-135697 filed on Jul. 11, 2017 including the specification, drawings and abstract is incorporated herein by reference in its entirety.

BACKGROUND

1. Technical Field

The present disclosure relates to an information providing system, information providing method, and a non-transitory recording medium.

2. Description of Related Art

A technology is known that, when a user records the feeling information held by the user at a certain position and the voice information related to the position into a mobile phone, summarizes the recorded information in a server, stores the summarized information and its associated position information in the server and, at the same time, attaches the stored data to the corresponding positions on a map (for example, see Japanese Unexamined Patent Application Publication (Translation of PCT Application) No. 2012-509534.

SUMMARY

According to the technology described in Japanese Unexamined Patent Application Publication (Translation of PCT Application) No. 2012-509534, the same user voluntarily records two types of information: one is the information (such as the voice information) on an event and a situation concerning a position and the other is the feeling information. For this reason, these two types of information tend to become subjective information, with the result that disproportionate emphasis is placed on a place about which the information is recorded and an event or a situation that is related to that position. Therefore, there is a possibility that it becomes difficult to generate, and provide to the user, a map in which the information on events and situations at various positions are associated with the feeling information on those positions while extensively collecting the information on the events and the situations at various positions in the real world.

The present disclosure provides an information providing system, information providing method, and a non-transitory recording medium that can extensively collect the information related to events and situations at various positions in the real world and, at the same time, provide the collected information, together with the feeling information on the positions, to the user.

A first aspect of the disclosure provides an information providing system. The information providing system according to the first aspect includes a circuitry configured to: collect, via a first network, sensing information from a vehicle, the sensing information being acquired at an arbitrary position by the vehicle; collect, via a second network, feeling information from a social networking service, the feeling information indicating a people's feeling about an arbitrary position; and cause a display mounted on a mobile terminal or a target vehicle to display a map image and to display each of at least a part of the sensing information and at least a part of the feeling information at a corresponding position in the map image, the feeling information being related to an acquisition position at which the sensing information was acquired by the vehicle.

According to the configuration described above, in addition to the feeling information that is subjective information collected from the web, the sensing information is collected from the vehicle (probe) as the information related to an event or a situation at an arbitrary position. The sensing information can be acquired in various places and from a large number of vehicles as the vehicle 3 moves, irrespective of the intention of the occupant of the vehicle. Therefore, the information providing system collects a wide range of sensing information related to the events and situations at various positions in the real world and, then, causes the display to display the contents of the collected sensing information, together with the feeling information corresponding to the acquisition positions of the sensing information, at the corresponding positions in the map image and, thereby, provides their contents to the user.

In the first aspect, the circuitry may be configured to display extracted feeling information at a corresponding position in the map image, the extracted feeling information being included in the feeling information acquired within a predetermined time from an acquisition time at which the sensing information was acquired by the vehicle.

According to the configuration described above, the information that is included in the feeling information related to the acquisition position of the sensing information and that is included in the feeling information in the time zone around the acquisition time is displayed on the display unit of the mobile terminal or the target vehicle. Therefore, the information providing system can appropriately display the information, included in the feeling information corresponding to an event and a situation at the acquisition time, and at the acquisition position, of the sensing information, in the map image of the display unit of the mobile terminal or the target vehicle.

In the first aspect, the circuitry may be configured to display extracted sensing information at a corresponding position in the map image, the extracted sensing information being included in the sensing information acquired within a predetermined time from a current time.

According to the configuration described above, the information providing system can cause the display unit of the mobile terminal or the target vehicle to display the information included in the sensing information that is collected within the latest predetermined time and is relatively new (that is, real-time information).

In the first aspect, the circuitry may be configured to determine an event or a situation around the acquisition position based on the collected sensing information, and display situation information at a corresponding position in the map image, the situation information being included in the sensing information and being related with the event or the situation.

According to the configuration described above, the information providing system can determine an event or a situation around the acquisition position based on the sensing information and, actually, causes the display unit of the mobile terminal or the target vehicle to display the event or the situation around the acquisition position of the sensing information.

In the first aspect, the circuitry may be configured to determine a feeling tendency including dominance between positive information and negative information indicated by the feeling information, based on the feeling information related to a common position, and display feeling tendency information at a corresponding position in the map image, the feeling tendency information being included in the feeling information.

According to the configuration described above, based on the feeling information on the common position, the information providing system can determine which feeling, positive or negative, is more dominant for the position and then causes the display unit of the mobile terminal or the target vehicle to display this feeling tendency.

In the first aspect, the sensing information may include a captured image generated by capturing surroundings of the vehicle.

According to the configuration described above, the information providing system can specifically determine various events and situations around the acquisition position of the captured image by performing known image recognition processing for the captured image and, then, cause the display unit of the mobile terminal or the target vehicle to display the resulting image.

In the first aspect, the circuitry may be configured to collect the feeling information by using posted information posted on the social networking service.

According to the configuration described above, the information providing system can collect the information on the acquisition position of the sensing information from among a large number of pieces of feeling information included in the posted information on the social networking service. Therefore, the information providing system can extensively collect the feeling information on various positions and provide the collected information to the user.

In the first aspect, the circuitry may be configured to acquire movement means information related to a movement means of a user who has the mobile terminal, and change an area included in the map image displayed on the display of the mobile terminal, based on a type of the movement means.

According to the configuration described above, though the movement distance assumed for the user can vary depending on the movement means, the information providing system can change the size of an area to be displayed in the map image in accordance with the assumed movement distance. Therefore, the information providing system can provide the user with the information included in each of the sensing information and the feeling information regarding a position where the user can actually move.

In the first aspect, the circuitry may be configured to change an area included in the map image displayed on the display, based on a destination of a user of the mobile terminal or the target vehicle.

According to the configuration described above, the information providing system can display the map image of an area nearer to the direction of movement from the current position to the destination to which the user is traveling, or can reduce the scale of the map image when the distance to the destination is relatively long. Therefore, the information providing system can provide the user with the information included in each of the sensing information and the feeling information on the position of the travel route to the destination to which the user is traveling.

In the first aspect, the circuitry may be configured to determine, from a current position of a user of the mobile terminal or the target vehicle to a destination, a recommended waypoint from among positions related to information included in at least one of the sensing information and the feeling information displayed in the map image, and display the recommended waypoint in the map image.

According to the configuration described above, from the current position of the user to the destination, the information providing system can recommend a position, for which information indicating positive feeling is included in the feeling information, to the user as a waypoint, from among the positions that are related to the information to be displayed in the map image (information included in each of the sensing information and the feeling information).

In the first aspect, the circuitry may be configured to acquire characteristic information on a preference of the user, and determine the recommended waypoint based on the characteristic information.

According to the configuration described above, the information providing system can recommend a position, such as the position of a facility, a shop, and so on, that matches the user's preference as a waypoint according to the preference of the user of the mobile terminal or the target vehicle.

In the first aspect, the circuitry may be configured to acquire schedule information on the user, and determine the recommended waypoint, from the current position of the user to a destination corresponding to a next schedule determined based on the schedule information, based on a free time to the next schedule.

According to the configuration described above, the information providing system can cooperate with a schedule application, such as the one provided for the mobile terminal, to acquire the user's schedule information and, from the current position to the destination determined by the next schedule, recommends a waypoint that matches the free time.

A second aspect of the disclosure provides an information providing method. The information providing method according to the second aspect includes: (a) collecting, via a first network, sensing information from a vehicle, the sensing information being acquired at an arbitrary position by the vehicle; (b) collecting, via a second network, feeling information from a social networking service, the feeling information indicating a people's feeling about an arbitrary position; and (c) causing a display mounted on a mobile terminal or a target vehicle to display a map image and to display each of at least a part of the sensing information and at least a part of the feeling information at a corresponding position in the map image, the feeling information being related to an acquisition position at which the sensing information was acquired by the vehicle.

A third aspect of the disclosure provides a non-transitory recording medium storing a program causing a computer to execute a method. The method includes: collecting, via a first network, sensing information from a vehicle, the sensing information being acquired at an arbitrary position by the vehicle; collecting, via a second network, feeling information from a social networking service, the feeling information indicating a people's feeling about an arbitrary position; and causing a display mounted on a mobile terminal or a target vehicle to display a map image and to display each of at least a part of the sensing information and at least a part of the feeling information at a corresponding position in the map image, the feeling information being related to an acquisition position at which the sensing information was acquired by the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A mode for carrying out the present disclosure will be described below with reference to the drawings.

[Configuration of Information Providing System]

First, a configuration of an information providing system 1 according to this embodiment will be described with reference to FIG. 1 to FIG. 5C.

Figure 1:
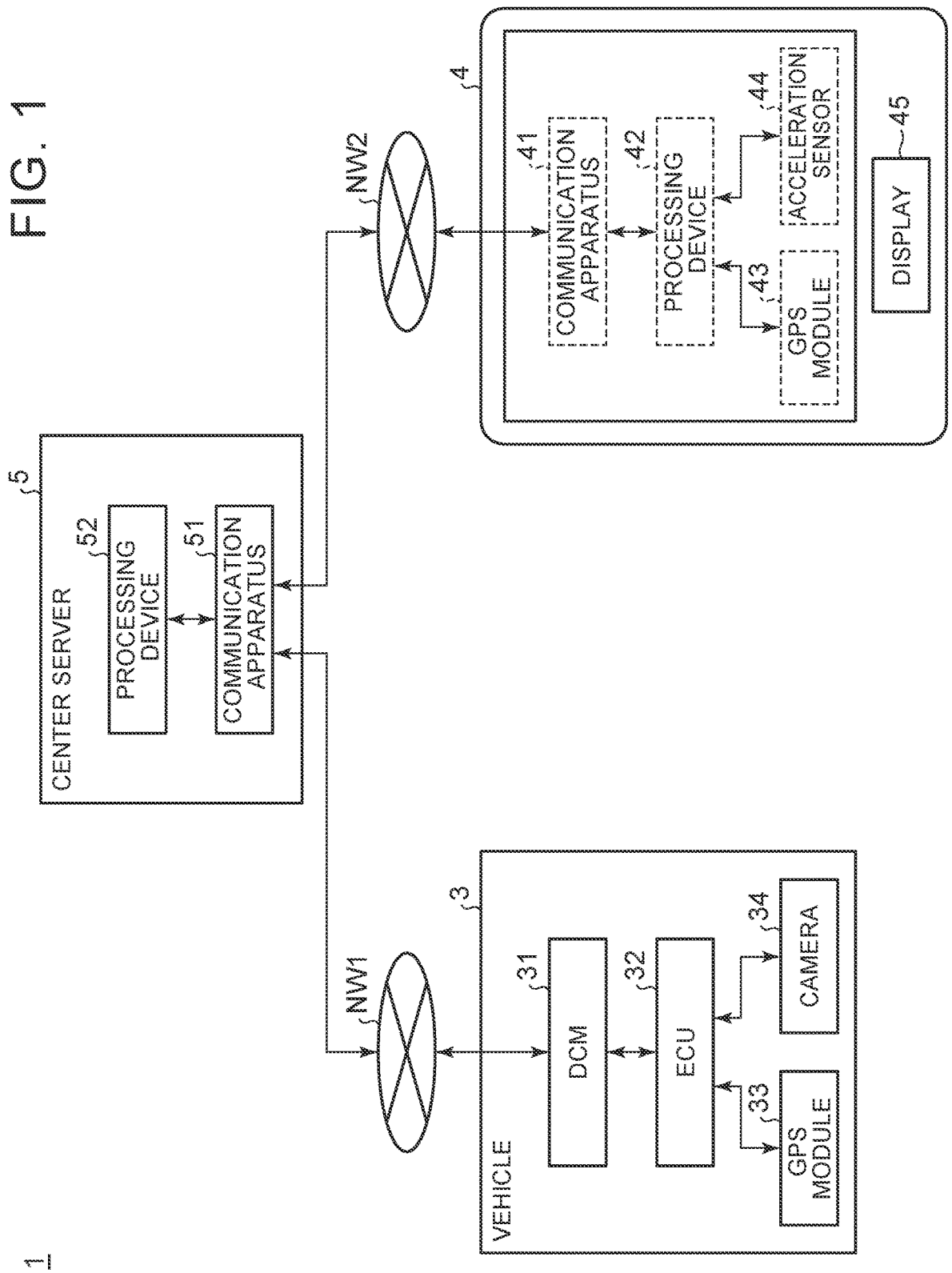
FIG. 1 is a diagram showing an example of a configuration of an information providing system.
Figure 2:
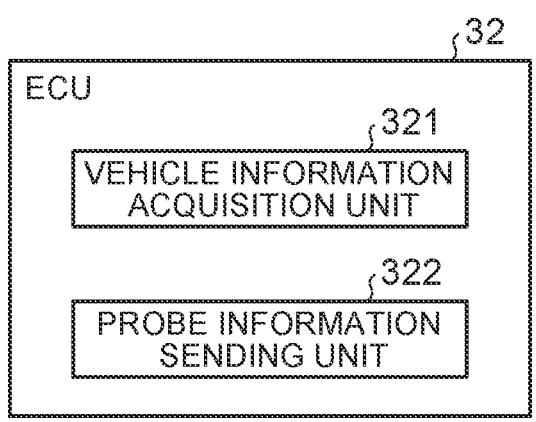
FIG. 2 is a functional block diagram showing an example of a functional configuration of a vehicle.
Figure 3:
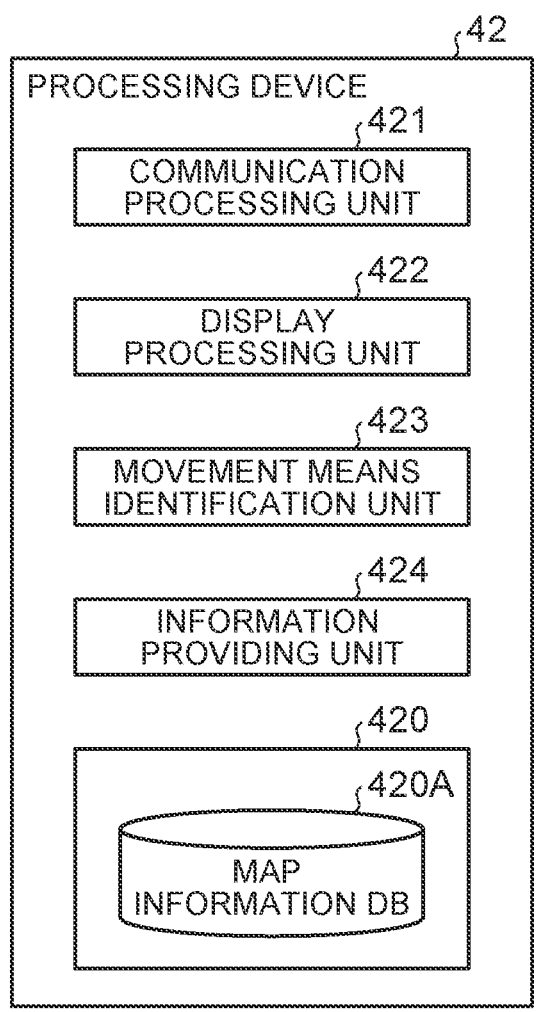
FIG. 3 is a functional block diagram showing an example of a functional configuration of a center server.
Figure 4:
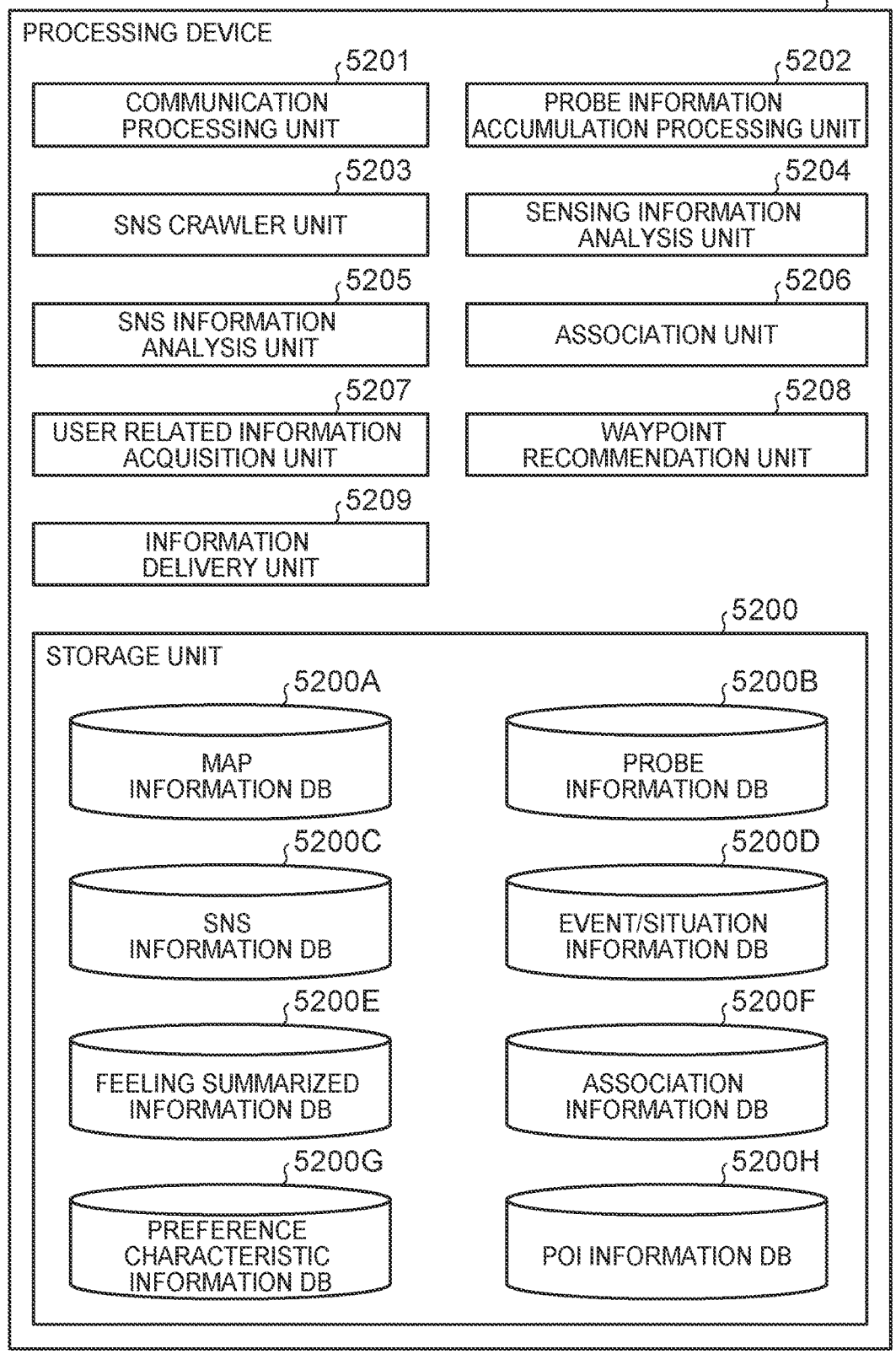
FIG. 4 is a functional block diagram showing an example of a functional configuration of a mobile terminal.

FIG. 1 is a diagram showing an example of a configuration of the information providing system 1 according to this embodiment. FIG. 2 is a functional block diagram showing an example of a functional configuration of a vehicle 3 according to this embodiment. FIG. 3 is a functional block diagram showing an example of a functional configuration of a mobile terminal 4 according to this embodiment. FIG. 4 is a functional block diagram showing an example of a functional configuration of a center server 5 according to this embodiment.

As shown in FIG. 1, the information providing system 1 according to this embodiment includes a plurality of vehicles 3, a plurality of mobile terminals 4, and the center server 5 connected to the vehicles 3 and the mobile terminals 4 in such a way that the center server 5 can communicate with them.

One vehicle shown in the figure has substantially the same configuration as that of the other vehicles 3 in relation to the information providing system 1. Similarly, one mobile terminal 4 shown in the figure has substantially the same configuration as that of the other mobile terminals 4 in relation to the information providing system 1. Therefore, in the figure, one vehicle 3 is shown as the representative of the vehicles, and one mobile terminal 4 as the representative of the mobile terminals.

As shown in FIG. 1, the vehicle 3 includes a Data Communication Module (DCM) 31, an Electronic Control Unit (ECU) 32, a Global Positioning System (GPS) module 33, and a camera 34.

The DCM 31 is a communication device that bi-directionally communicates with the center server 5 through a predetermined communication network NW1 including, for example, a cellular phone network with a number of base stations as its terminals or the Internet (the same also applies to the communication network NW2). The DCM 31 is connected to various ECUs, including the ECU 32, in such a way that they can communicate with each other through an in-vehicle network such as Controller Area Network (CAN).

The ECU 32 is an electronic control unit that performs various types of control processing related to the predetermined functions in the vehicle 3. For example, the ECU 32 acquires various types of information (vehicle information) on the various states of the vehicle 3 (vehicle state), on the state of the occupants of the vehicle 3, and on the state around the vehicle 3 and, via the DCM 31, uploads the acquired information to the center server 5 as the probe information. The vehicle information may include the information on the control signals corresponding to the various control states of the vehicle 3 (control signal information) and various types of information acquired by the various sensing devices mounted on the vehicle 3 (sensing information). The function of the ECU 32 may be implemented by arbitrary hardware, software, and a combination of hardware and software. For example, the ECU 32 is mainly composed of a microcomputer including a Central Processing Unit (CPU), a Random Access Memory (RAM), a Read Only Memory (ROM), an auxiliary storage device, and an Input-Output Interface (I/O). The ECU 32 includes a vehicle information acquisition unit 321 and a probe information sending unit 322 as functional units that are implemented by executing one or more programs, stored in a ROM or an auxiliary storage device, on the CPU.

The functions of the ECU 32 may be shared, in part, by one or more of the other ECUs.

The vehicle information acquisition unit 321 acquires vehicle information, received from the GPS module 33, the camera 34, etc., from a buffer in the RAM. More specifically, the vehicle information acquisition unit 321 acquires the position information on the vehicle 3 received from the GPS module. In addition, the vehicle information acquisition unit 321 acquires a captured image around the vehicle 3 (an example of sensing information) received from the camera 34.

The probe information sending unit 322 generates, at a periodic interval, the probe information. The probe information includes various vehicle information acquired by the vehicle information acquisition unit 321 and the time information corresponding to the vehicle information (for example, the information on the time when the vehicle information was acquired). Then, the probe information sending unit 322 sends the generated probe information to the center server 5 via the DCM 31. That is, the probe information includes various types of sensing information and the time information concerning the time at which the sensing information was acquired by various sensing devices.

Note that the probe information, sent from the vehicle 3 to the center server 5, may not always include the time information corresponding to various vehicle information (that is, the time information on the time at which the sensing information was acquired). In this case, as the time information corresponding to various vehicle information, the center server 5 may use the time when the probe information is sent from the vehicle 3, the time when the probe information is received by the center server 5, or the estimated time corresponding to the position information on the vehicle 3 calculated from the probe information sending/reception times. The center server 5 may add the time information to the probe information as the time information corresponding to various vehicle information included in the probe information received from the vehicle 3.

The GPS module 33 receives GPS signals, sent from three or more satellites (preferably four or more satellites) above the vehicle 3, to measure the position of the vehicle 3 on which the GPS module 33 is mounted. The GPS module 33 is connected to the ECU 32 in such a way that they can communicate with each other through a one-to-one communication line or an in-vehicle network such as the CAN. The position information on the vehicle 3, measured in this way, is input to the ECU 32.

The camera 34 is a known capturing unit for capturing the surroundings of the vehicle 3, for example, a predetermined capturing range in front of the vehicle 3. The camera 34 is attached, for example, to the center upper-end portion on the vehicle interior side of the windshield of the vehicle 3, that is, attached to the center of the front header on the interior side of the vehicle 3. The camera 34 is activated by the ignition-on (IG-ON) of the vehicle 3 and, from the time it is activated to the time of the ignition-off (IG-OFF) of the vehicle 3, captures a predetermined capturing range ahead of the vehicle 3 at predetermined intervals, for example, every 1/30 second. The camera 34 is connected to the ECU 32 in such a way they can communicate with each other via a one-to-one communication line or an on-vehicle network such as the CAN. The captured image is input to the ECU 32.

The mobile terminal 4 is a mobile phone, a smartphone, or a tablet terminal possessed by a user to whom the information is provided. As shown in FIG. 1, the mobile terminal 4 includes a communication apparatus 41, a processing device 42, a GPS module 43, an acceleration sensor 44, and a touch panel display (hereinafter simply referred to as "display") 45.

The communication apparatus 41 is a device that bi-directionally communicates with the center server 5 through a predetermined communication network NW2 under the control of the processing device 42. The communication apparatus 41 is a mobile communication module complying with the communication standards such as Long Term Evolution (LTE), 4th Generation (4G), or 5th Generation (5G).

The processing device 42 performs various control processing in the mobile terminal 4. The processing device 42 is mainly composed of a computer including a CPU, a RAM, a ROM, an auxiliary storage device, and an I/O. As shown in FIG. 3, the processing device 42 includes a communication processing unit 421, a display processing unit 422, a movement means identification unit 423, and an information providing unit 424 as the functional units that are implemented by executing one or more programs, stored in the ROM or the auxiliary storage unit, on the CPU. Furthermore, as shown in FIG. 3, the processing device 42 includes a storage unit 420 as a storage area defined in the ROM or the auxiliary storage device. The storage unit 420 includes a map information DB (Database) 420A.

The map information DB 420A is updated, as appropriate, by the map information delivered from the center server 5. That is, the same information as that stored in a map information DB 5200A of the center server 5, which will be described later, is stored in the map information DB 420A.

The communication processing unit 421 controls the communication apparatus 41 to send and receive various signals to and from the center server 5.

The display processing unit 422 causes the display 45 to display various images. For example, the display processing unit 422 causes the display 45 to display a composite map image, which will be described later, to be displayed in response to a request from the information providing unit 424 as will be described later.

The movement means identification unit 423 uses an arbitrary method to identify by which of the plurality of pre-defined movement means the user, who has the mobile terminal 4, is traveling. For example, the movement means identification unit 423 identifies by which means (walking, bicycle, train, bus, or vehicle (except bus)) the user is moving. For example, based on the acceleration information received from the acceleration sensor 44, the movement means identification unit 423 may use a plurality of discriminators, which have learned in advance to distinguish between a case in which the user moves using one movement means and a case in which the user moves using another movement means, to make the identification. In addition, the movement means identification unit 423 may make the identification, based on the position information on the mobile terminal 4 received from the GPS module 43 in addition to, or in place of, the acceleration information received from the acceleration sensor 44.

The function of the movement means identification unit 423 may be provided on the center server 5 side. In this case, based on a composite map image request which will be described later, the center server 5 may acquire the position information from each mobile terminal 4 to identify the movement means of the mobile terminal 4. The center server 5 may further acquire the acceleration information from each mobile terminal 4 to identify the movement means of each mobile terminal 4.

The information providing unit 424 causes the display 45 to display a composite map image in response to a user's predetermined operation via the display processing unit 422. A composite map image, which is delivered from the center server 5, includes a map image and the additional information superimposed on the map image. More specifically, the information providing unit 424 causes the display 45 to display, in the superimposed mode, the two types of information, one is the information (event/situation information) on the event/situation at an actual position and the other is the information summarizing the feeling information on the same position (feeling summarized information), at the corresponding position within the map image. This display allows the user to find the event/situation at a certain position together with the feeling summarized information indicating the feeling of a person with respect to the event/situation. Therefore, the user can determine whether an event or a situation at a certain position can lead to a positive feeling when selecting a future action. The detail of a composite map image will be described later.

The function of the information providing unit 424 becomes available when a predetermined application program (hereinafter referred to as "information providing application"), installed in the mobile terminal 4 (the processing device 42), is started in response to a user's predetermined operation. When the information providing application is started, the information providing unit 424 sends a request signal (composite map image request), which is a request for a composite map image, via the communication processing unit 421. This allows the information providing unit 424 to cause the display 45 to display a composite map image received from the center server 5 via the communication processing unit 421. A composite map image request includes the position information on the mobile terminal 4 received from the GPS module 43. Furthermore, a composite map image request may include the setting information on an area of the base map image (area setting information) that is set by a predetermined user's operation or according to the history of user's operations performed in the past for the information providing application. In addition, a composite map image request may include the setting information on the scale of the base map image that is set by a user's predetermined operation or according to the history of user's operations performed in the past for the information providing application, for example, the setting information indicating whether to display, by default, a wide area map whose scale is larger than a predetermined scale and a detailed image whose scale is a predetermined scale or less as the base map image. In addition, a composite map image request may include the information on the user's current movement means of the mobile terminal 4 (the movement means information), that is, the information on the result identified by the movement means identification unit 423. Furthermore, a composite map image request may include the information on a destination (destination information) that is entered by a user's predetermined operation or estimated based on the user's schedule information. In this case, the information providing unit 424 works with a schedule management application program (hereinafter referred to as "schedule management application"), installed in the mobile terminal 4 (the processing device 42), to acquire the user's schedule information. In this case, the information providing unit 424 may include the user's next scheduled position, included in the schedule information, in the composite map image request as the destination information. Furthermore, a composite map image request may include the user's schedule information itself acquired from the schedule management application.

The information providing unit 424 sends a composite map image request, as necessary, to the center server 5 via the communication processing unit 421 as the mobile terminal 4 continues to move, thereby updating the composite map image after the information providing application was started.

The center server 5 (an example of an information providing system) collects the probe information, which includes various types of sensing information, from each vehicle 3. In addition, the center server 5 collects, on the web, the information on the human's feeling (feeling information). After that, the center server 5 generates a composite map image that includes the information on an event or a situation at a certain position, determined by the sensing information, and the feeling summarized information on the same position determined from the feeling information and, then, delivers the generated composite map image to the terminal 4. As shown in FIG. 1, the center server 5 includes a communication apparatus 51 and a processing device 52.

The function of the center server 5 may be implemented by a plurality of servers.

The communication apparatus 51 is a device that bi-directionally communicates with each of the vehicles 3 and each of the mobile terminals 4 under control of the processing device 52 through predetermined communication networks NW1 and NW2.

The processing device 52 performs various types of control processing in the center server 5. The processing device 52 is composed mainly of one or more server computers each of which includes a CPU, a RAM, a ROM, an auxiliary storage device, an I/O, and so on. The processing device 52 includes the following functional units that are implemented by executing one or more programs, stored in the ROM or the auxiliary storage device, on the CPU: a communication processing unit 5201, a probe information accumulation processing unit 5202, an SNS crawler unit 5203, a sensing information analysis unit 5204, an SNS information analysis unit 5205, an association unit 5206, a user related information acquisition unit 5207, a waypoint recommendation unit 5208, and an information delivery unit 5209. Furthermore, the processing device 52 includes a storage unit 5200 that is a storage area defined in the auxiliary storage device of the server computer or in the external storage device connected to the server computer. The storage unit 5200 includes a map information DB 5200A, a probe information DB 5200B, an SNS information DB 5200C, an event/situation information DB 5200D, a feeling summarized information DB 5200E, an association information DB 5200F, a preference characteristic information DB 5200G, and a POI (Point Of interest) information DB 5200H.

The communication processing unit 5201 controls the communication apparatus 51 to send and receive various signals (control signals, information signals, etc.) to and from each of the plurality of vehicles 3 and to and from each of the plurality of mobile terminals 4.

The probe information accumulation processing unit 5202 (an example of the sensing information collection unit) collects the sensing information (captured image in this embodiment), acquired by each vehicle 3 at an arbitrary position, from each vehicle 3. More specifically, the probe information accumulation processing unit 5202 accumulates the probe information, received by the communication processing unit 5201 from each of the vehicles 3, into the probe information DB 5200B for each vehicle 3. That is, the probe information saved in the probe information DB 5200B is stored on a time series basis, with the probe information associated with the identification information on the corresponding vehicle 3, for example, the VIN (Vehicle Index Number) or the uniquely defined vehicle ID (Identifier).

The SNS crawler unit 5203 (an example of the feeling information collection unit) periodically (e.g., every 30 minutes) collects (downloads) the SNS posted information (an example of feeling information) posted on a predetermined SNS after the previous processing, as well as the position information (posting position information) and the time information (posting time information) at which the information was posted, based on a known algorithm. In other words, the SNS crawler unit 5203 collects the SNS posted information as the human feeling information concerning an arbitrary position. The SNS crawler unit 5203 saves the SNS posted information in the SNS information DB 5200C with the collected SNS posted information associated with the corresponding posting position information and the posting time information.

When the posting position information corresponding to the SNS posted information is not disclosed, the SNS crawler unit 5203 saves only the SNS posted information and the posting time information that are associated with each other.

The sensing information analysis unit 5204 identifies an event at a sensing information acquisition position and the situation of the event at the acquisition position at predetermined time intervals (for example, every 30 minutes), based on the sensing information included in the probe information acquired by each vehicle 3 in the most recent predetermined time (for example, 30 minutes). In this embodiment, the sensing information analysis unit 5204 identifies (extracts) an event and a situation at the acquisition position of a captured image, based on the captured image (the sensing information) around the vehicle 3. The sensing information analysis unit 5204 performs the image recognition processing by applying artificial Intelligence (AI), in particular, a known technique related to machine learning such as depth learning, to extract an event and a situation at the acquisition position and the acquisition time of a captured image. An event to be determined by the sensing information analysis unit 5204 (hereinafter referred to as a target event) may be an event that may occur temporarily (unexpectedly) (for example, occurrence of a queue, occurrence of traffic congestion, blooming of cherry blossoms, opening of stores, etc.) or may be a stationary event at that position (for example, time rental parking fee displayed on the signboard of a parking lot). Furthermore, the situation of a target determined by the sensing information analysis unit 5204 may be the situation of a temporary event or the situation of a stationary event at that position (for example, the situation indicating the store-front price at a certain gas station). In addition, the sensing information analysis unit 5204 may extract an arbitrary event and an arbitrary situation as the target event based on the captured image, or may extract the presence or absence of one or more predefined target events or one or more predefined target situations. The target events may include the following: the occurrence of a queue at a store front, the occurrence of congestion (traffic congestion) in a predetermined area, the holding of a temporary event, the blooming of cherry blossoms, and the coloring of hardwoods. The target situations include the following: the status of a queue (occurrence situation, change in the situation of a generated queue, etc.), the congestion situation of a predetermined area (occurrence situation, change in the situation of congestion that has occurred), the situation of an event (event status, busy condition of an event being held), the blooming status of cherry blossoms (the situation such as whether cherry blossoms have started blossoming, current blooming status), the coloring situation of hardwoods (autumn leaves situation), the situation of the store-front price at a gas station, the full/empty state at a time rental parking lot, and the situation of whether a taxi can be found easily at a certain place (the situation of unoccupied taxi cruising).

Figure 5A:
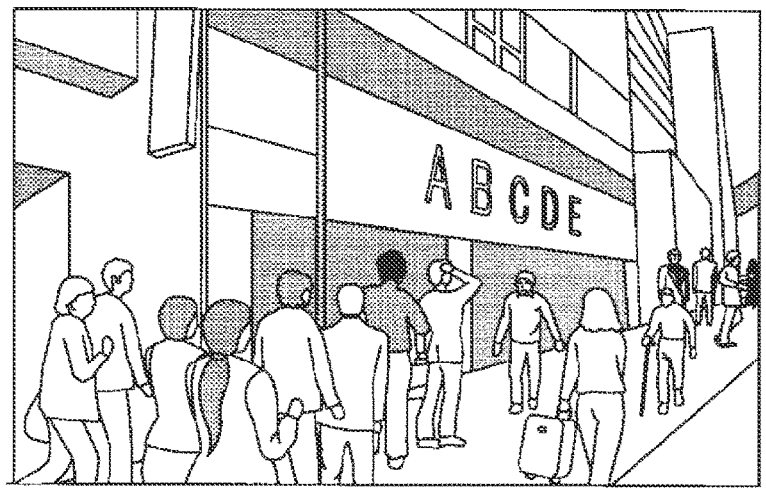
FIG. 5A is a diagram showing a specific example of a captured image.
Figure 5B:
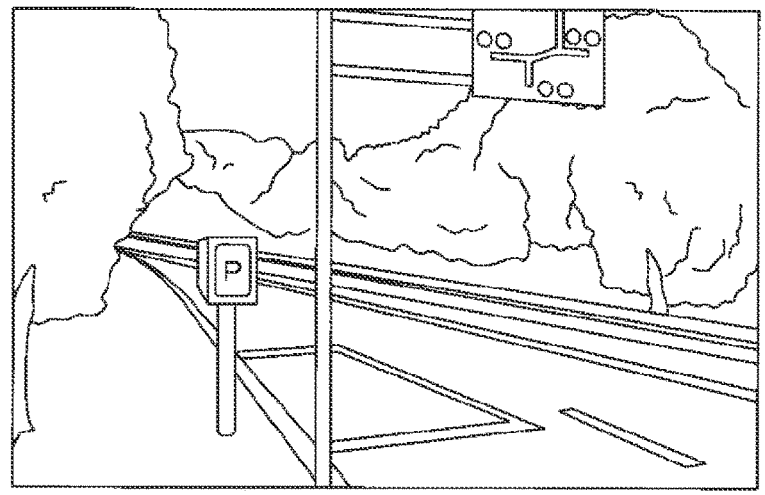
FIG. 5B is a diagram showing a specific example of a captured image.
Figure 5C:
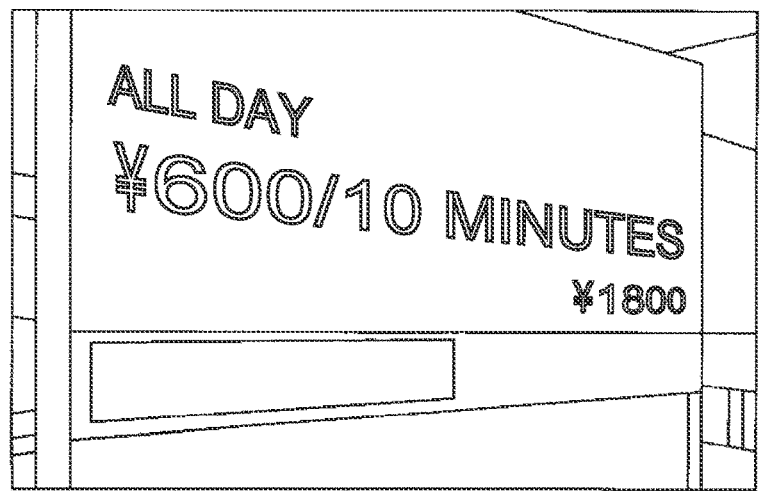
FIG. 5C is a diagram showing a specific example of a captured image.

For example, FIG. 5A, FIG. 5B, and FIG. 5C are diagrams showing, respectively, an example of a captured image captured by the camera 34 of the vehicle 3, another example the captured image, and a still another example of the captured image.

As shown in FIG. 5A, the captured image in this example includes a large number of people queuing in front of a store. Therefore, the sensing information analysis unit 5204 can determine the occurrence of a queue, and the status of the queue, at the acquisition position of the captured image by performing image recognition processing for the captured image.

Furthermore, as shown in FIG. 5B, the captured image in this example includes an on-road parking lot provided on the road (road side). Therefore, the sensing information analysis unit 5204 can determine the full/empty state indicated by the on-road parking meter installed near the acquisition position of the captured image by performing the image recognition processing for the captured image.

Furthermore, as shown in FIG. 5C, the captured image in this example includes a signboard displaying a fee for a time rental parking lot. Therefore, the sensing information analysis unit 5204 can specifically determine the fee that is set for the time rental parking lot installed near the acquisition position of the captured image by performing the image recognition processing for the captured image.

Returning to FIG. 4, the sensing information analysis unit 5204 associates an event, a situation, and so on at the acquisition position of an extracted captured image with the position information on the captured image extracted from the extraction source and stores the associated information in the event/situation information DB 5200D.

The SNS information analysis unit 5205 (an example of a feeling information analysis unit) generates, at predetermined time intervals (for example, every 30 minutes), the feeling summarized information that summarizes the people's feeling concerning a certain position, based on the SNS posted information that is saved in the SNS information DB 5200C and that was posted in the latest predetermined time (for example, 30 minutes). At this time, the SNS information analysis unit 5205 performs this processing in synchronization with the processing performed by the sensing information analysis unit 5204. As a result, synchronization is established between the event/situation information, determined by the sensing information analysis unit 5204, and the feeling summarized information determined by the SNS information analysis unit 5205 on a time series basis. In other words, the SNS information analysis unit 5205 can generate the feeling summarized information that is appropriate for the events and situations indicated by the event/situation information. More specifically, the SNS information analysis unit 5205 generates the feeling summarized information that summarizes the people's feeling indicated by a plurality of pieces of SNS post information concerning the same (common) position, more specifically, concerning the same position range. The feeling summarized information includes, for example, the information on the people's feeling tendency (feeling tendency information), such as which feeling, positive or negative, is dominant, the information on the magnitude of the feeling, and so on. Positive feelings may include, for example, pleasure, delight, relief, etc. Negative feelings may include sadness, anger, and so on. In addition, for the SNS posted information on a certain position, the feeling tendency information may include the information indicating which of the following two is larger: the SNS posted information belonging to the positive feeling and the SNS posted information belonging to the negative feeling. In addition, the information on the magnitude of feeling may be expressed, for example, by the total number of pieces of SNS posted information that is one of the positive feeling and the negative feeling and that corresponds to the feeling tendency of the target position range.

The "position range" mentioned above may be, for example, a block-number level range in the address, a town-name level range in the address, or a wider range.

For example, the SNS information analysis unit 5205 extracts the SNS posted information whose posting position information is disclosed, that is, the SNS posted information stored in the SNS information DB 5200C in such a way that it is associated with the posting position information. In addition, for the SNS posted information whose posting position information is not disclosed, that is, the SNS posted information saved in the SNS information DB 5200C in such a way that it is not associated with the posting position information, the SNS information analysis unit 5205 may analyze whether its contents indicate that the posting user was present at a certain position. More specifically, as in the image recognition processing above described, the SNS information analysis unit 5205 can perform the text recognition processing by applying a known technique related to machine learning such as depth learning, so that it can be determined whether the information on the position is included or whether the user was present. Then, if it can be determined that the user was present at a certain position, the SNS information analysis unit 5205 may extract the SNS posted information as the SNS posted information on the arbitrary position.

Furthermore, the SNS information analysis unit 5205 divides the extracted SNS posted information concerning an arbitrary position into groups each of which is composed of the SNS posted information corresponding to the same position, more specifically, the same position range (SNS posting groups). Then, the SNS information analysis unit 5205 extracts the SNS posting groups each including a relatively large number (more specifically, a predetermined number or more) of pieces of SNS posted information. For each extracted SNS posted group, the SNS information analysis unit 5205 determines whether the SNS posted information included in the group corresponds to the positive feeling or the negative feeling and, at the same time, identifies, as a whole, which feeling, positive or negative, is dominant. By doing so, the SNS information analysis unit 5205 can generate the feeling summarized information including the feeling tendency information on a certain position and the information on the magnitude of feeling.

The SNS information analysis unit 5205 associates the generated feeling summarized information with the corresponding position information (for example, position information representing the position range, etc.) and then stores the associated information in the feeling summarized information DB 5200E.

The association unit 5206 checks the latest event/situation information, stored in the event/situation information DB 5200D, and the latest feeling summarized information, stored in the feeling summarized information DB 5200E, to establish the association between the event/situation information and the feeling summarized information both of which correspond to the same position (more specifically, same position range). Furthermore, based on the POI information DB 5200H, the association unit 5206 identifies the POI information on shops or facilities corresponding to a position related to the event/situation information and the feeling summarized information that are associated. After that, the association unit 5206 saves the association information in the association information DB 5200F. The association information includes the information (association target identification information) that identifies the event/situation information and the feeling summarized information that are associated and the POI information (specific POI information) corresponding to the position related to the event/situation information and the feeling summarized information that are associated. For example, the association target identification information includes the unique identification information identifying the associated event/situation information stored in the event/situation information DB 5200D and the unique identification information identifying the associated feeling summarized information stored in the feeling summarized information DB 5200E.

The user related information acquisition unit 5207 acquires the information (user related information) related to the delivery destination of a composite map image to be delivered by the information delivery unit 5209, that is, the information on the user of the mobile terminal 4 that is the source of the composite map image request received by the communication processing unit 5201.

For example, the user related information acquisition unit 5207 acquires the position information (current position information) on the current position of the user of the mobile terminal 4. More specifically, the user related information acquisition unit 5207 acquires the current position information by extracting the position information on the user of the mobile terminal 4 that is included in a composite map image request.

For example, the user related information acquisition unit 5207 (an example of the movement means information acquisition unit) acquires information on the movement means of the user of the mobile terminal 4 (the movement means information). More specifically, from a composite map image request, the user related information acquisition unit 5207 acquires the movement means information of the user of the mobile terminal 4 included in the request.

For example, the user related information acquisition unit 5207 (an example of a schedule information acquisition unit) acquires the future schedule information on the user of the mobile terminal 4. More specifically, when the user's schedule information is included in a composite map image request, the user related information acquisition unit 5207 may extract the schedule information from the composite map image request to acquire the schedule information.

For example, the user related information acquisition unit 5207 (an example of a characteristic information acquisition unit) acquires the characteristic information (preference characteristic information) on the preference, such as the interest or concern, of the user of the mobile terminal 4 from the preference characteristic information DB 5200G.

The preference characteristic information may be registered in the preference characteristic information DB 5200G by the user of the mobile terminal 4 by performing the setting entry operation through a predetermined web page. In addition, the preference characteristic information may be estimated based on the history of information browsing via the Internet (the network information browsing history) performed by the user of the mobile terminal 4, that is, based on the history of actions in the online mode, and the estimated result may be registered in the preference characteristic information DB 5200G. In this case, the center server 5 can acquire the online action history information on the user of the mobile terminal 4, based on the history of information browsing via the Internet (network information browsing history) associated with the unique identifier of the mobile terminal 4 that can be acquired from a plurality of web servers in the ad network including the center server 5.

In addition, the user related information acquisition unit 5207 acquires the information on the destination (destination information) to which the user of the mobile terminal 4 will move. More specifically, when the user's destination information is included in a composite map image request, the user related information acquisition unit 5207 may acquire the destination information from the composite map image request. In addition, when the user's schedule information is included in a composite map image request, the user related information acquisition unit 5207 may acquire the destination information by estimating the destination, to which the user is to move, based on the user's schedule information. Furthermore, the user related information acquisition unit 5207 may estimate the user's destination based on the movement history of the user of the mobile terminal 4. In this case, the processing device 52 collects the information on the movement history of the mobile terminal 4 (movement history information), which includes the position information and the time information, from each mobile terminal 4 for accumulating it in the storage unit 5200. As a result, the user related information acquisition unit 5207 can analyze the past action tendencies of the user of the mobile terminal 4 and, as in the image recognition processing above described, estimate the destination by applying a known technique related to machine learning such as depth learning.

The waypoint recommendation unit 5208 determines a waypoint from the current position of the user of the mobile terminal 4 to the destination when the destination information is acquired by the user related information acquisition unit 5207. This waypoint is a place that is recommended to the user of the mobile terminal 4. More specifically, the waypoint recommendation unit 5208 determines a recommended waypoint from among the positions corresponding to the event/situation information and feeling summarized information that are associated by the association unit 5206. In other words, the waypoint recommendation unit 5208 determines a recommended waypoint from among the positions that are to be displayed in the map image in the superimposed mode by the information delivery unit 5209, which will be described later, and that are positions related to the event/situation information and the feeling summarized information.

For example, from the latest association information saved in the association information DB 5200F, the waypoint recommendation unit 5208 extracts the association information corresponding to a position, where the user may visit on the way, as a waypoint of travel from the current position to the destination. In addition, based on the preference characteristic information DB 5200G, the waypoint recommendation unit 5208 identifies the association information that is included in the acquired association information and that includes specific POI information on a genre that matches the preference characteristics of the user of the target mobile terminal 4. The waypoint recommendation unit 5208 further identifies the association information which is included in the identified association information and whose feeling tendency information, included in the feeling summarized information, is positive information. Then, from the positions (more specifically, POIs) corresponding to one or more pieces of the identified association information, the waypoint recommendation unit 5208 determines the waypoint. For example, the waypoint recommendation unit 5208 may determine, as a recommended waypoint, a position (POI) that is included in the positions corresponding to the identified plurality of pieces of association information and that is nearest to the destination. The waypoint recommendation unit 5208 may also determine, as a recommended waypoint, a position whose distance from the shortest route from the current position to the destination is smallest.

In addition, when the schedule information is acquired by the user related information acquisition unit 5207, the waypoint recommendation unit 5208 may determine, from the current position of the user of the mobile terminal 4 to the destination corresponding to the next schedule indicated by the next-schedule information, based on the free time to the next schedule. For example, the waypoint recommendation unit 5208 may determine the position (POI), which is recommended as the waypoint, according to the length of the free time. More specifically, the waypoint recommendation unit 5208 further identifies one or more pieces of association information whose feeling tendency information, included in the feeling summarized information, is identified as the one related to positive feeling and which includes specific POI information indicating a POI the user can visit during the free time. Then, from among the positions (more specifically POIs) corresponding to the one or more pieces of association information that has been identified, the waypoint recommendation unit waypoint recommendation unit 5208 determines the waypoint. For example, in the case of a movie theater, the length of a movie is usually about two hours. Therefore, when the free time is three hours or more, the waypoint recommendation unit 5208 may identify the association information that includes a movie theater as the specific POI information.

The information delivery unit 5209 (an example of a display control unit) generates a composite map image in a map image that is the base of a predetermined area when a composite map image request is received by the communication processing unit 5201. In the composite map image, the latest event/situation information and the latest feeling summarized information, both of which are related to an arbitrary position in the area, and the POI information (more specifically, specific POI information included in the association information) corresponding to the position are superimposed. The information delivery unit 5209 delivers the generated composite map image to the mobile terminal 4, which is the sending source of the composite map image request, via the communication processing unit 5201. This allows the information delivery unit 5209 to display the composite map image on the display 45 of the mobile terminal 4.

The information delivery unit 5209 may generate the composite map image of an area that includes the current position of the mobile terminal 4 acquired by the user related information acquisition unit 5207. In this case, according to the movement direction of the mobile terminal 4 (that is, according to the information on the difference between the position information on the mobile terminal 4 included in the previous composite map image request and that included in the current composite map image request), the information delivery unit 5209 may generate the composite map image of an area nearer to a position in the movement direction than the current position of the mobile terminal 4. This makes it easier for the user to know the event/situation information and the feeling summarized information on the area existing in the direction in which the user is to move by referencing the composite map image displayed on the display 45 of the mobile terminal 4, thus improving the user's convenience.

In addition, the information delivery unit 5209 may generate the composite map image of an area defined by the area setting information when it is included in the composite map image request. This makes it possible to provide the composite map image of an area that meets the preference of the user.

Furthermore, the information delivery unit 5209 may change the area included in the composite map image according to the destination information acquired by the user related information acquisition unit 5207.

For example, the information delivery unit 5209 generates the composite map image of an area centered on a position nearer to the destination based on the destination information than to the current position of the user of the mobile terminal 4. Furthermore, the information delivery unit 5209 generates the composite map image of an area that includes both the current position and the destination. This makes it possible for the user, who references the composite map image displayed on the display 45 of the mobile terminal 4, to know the event/situation information and the feeling summarized information on an area in the direction towards the destination to which the user is to move and on the area around the destination, thus improving the user's convenience.

Furthermore, the information delivery unit 5209 may generates the composite map image of an area including only the destination, for example, when the distance between the current position and the destination is relatively large (more specifically, when the distance is more than the predetermined threshold). Thus, this allows the user to narrow the area down to only the area including the destination when the distance between the current position and the destination is relatively large and therefore the scale of the map image including both the current position and the destination is becomes too small, thereby providing the user with a composite map image of an appropriate scale.

Furthermore, though a composite map image is generated on the premise that the generated area includes the current position, the information delivery unit 5209 changes the area included in the composite map image according to the distance between the current position of the user of the mobile terminal 4 and the destination. More specifically, the information delivery unit 5209 may increase the size of the area including the current position, which is included in the composite map image (that is, may reduce the scale of the base map image) as the distance from the current position to the destination becomes larger. As a result, when the travel distance to the destination is long, this ability makes it possible for the user to get more event/situation information and more feeling summarized information about the area in the direction approaching the destination, to which the user is to move, on the composite map image including the current position, thus improving the user's convenience.

Furthermore, when generating the composite map image of an area including the current position of the mobile terminal 4, the information delivery unit 5209 may change the size of the area included in the composite map image according to the movement means information acquired by the user information acquisition unit (that is, according to the movement means of the user of the mobile terminal 4). More specifically, the movement speed changes depending on the movement means, with the result that the assumed movement range (movable distance) of the user changes. For example, the information delivery unit 5209 increases the size of the area included in the composite map image (that is, reduces the scale of the composite map image) as the movement means of the user is changed in the order of walking, a bicycle, a bus, a vehicle, and a train (that is, as the movement speed of the movement means is increased). This allows the event/situation information and the feeling summarized information to be provided according to the movement range of the user.

In addition, the information delivery unit 5209 may generate, as the initial screen, a composite map image based on a relatively small-scale map image (wide area map image) including the current position of the mobile terminal 4 and, then, deliver the generated composite map image to the mobile terminal 4 through the communication processing unit 520. After that, when the user performs an operation to select a part of the area included in the composite map image that includes the wide-area map image (more specifically, when the user touches an arbitrary position on the composite map image on the display 45), the information delivery unit 5209 may generate a composite map image based on a relatively large-scale map image (detailed map image) of the selected area in response to a composite map image request from the mobile terminal 4 and deliver the generated composite map image through the communication processing unit 5201. This makes it possible for the user to select an area to be displayed by the operation performed by the user, thus improving the user's convenience. Furthermore, in this case, the information delivery unit 5209 may display the summary information on each of the event/situation information and the feeling summarized information in the composite map image based on the wide area map image. More specifically, the information delivery unit 5209 generates a composite map image by narrowing the number of positions (POIs) for which the event situation information and the feeling summarized information are displayed. This prevents the event situation information and the feeling summarized information, included in the composite map image based on the wide area map image, from becoming complicated, and the user's convenience from being lost. For example, the information delivery unit 5209 may determine the event situation information and the feeling summarized information to be included in the composite map image, based on the preference characteristic information acquired by the user related information acquisition unit 5207. That is, the information delivery unit 5209 may generate a composite map image that includes the event/situation information and the feeling summarized information on the POI related to the same preference genre as the preference genre included in the preference characteristic information corresponding to the user of the mobile terminal 4 which is the sending source of the composite map image request. This makes it possible to generate a composite map image in which the number of positions at which the event situation information and the feeling summarized information are displayed is narrowed down in accordance with the preference characteristics of the user.

Furthermore, the information delivery unit 5209 may generate a composite map image in which the information on a waypoint (waypoint information), recommended by the waypoint recommendation unit 5208, is further superimposed on the map image. For example, for the POI information that corresponds to the event/situation information and the feeling summarized information to be superimposed on the map image and that corresponds to the waypoint recommended by the waypoint recommendation unit 5208, the information delivery unit 5209 adds the information (for example, blinking POI information, etc.) indicating a recommended waypoint to the composite map image. As a result, from the current position to the destination, the user can receive the information on the recommended waypoints that can be dropped in, considering the user's preference or the free time based on the schedule information. Thus, the user's convenience is improved.

[Detail of Composite Map Image]

Next, with reference to FIG. 6, the detail of a composite map image delivered from the center server 5 to the mobile terminal 4 and displayed on the display 45 of the mobile terminal 4 will be described.

Figure 6:
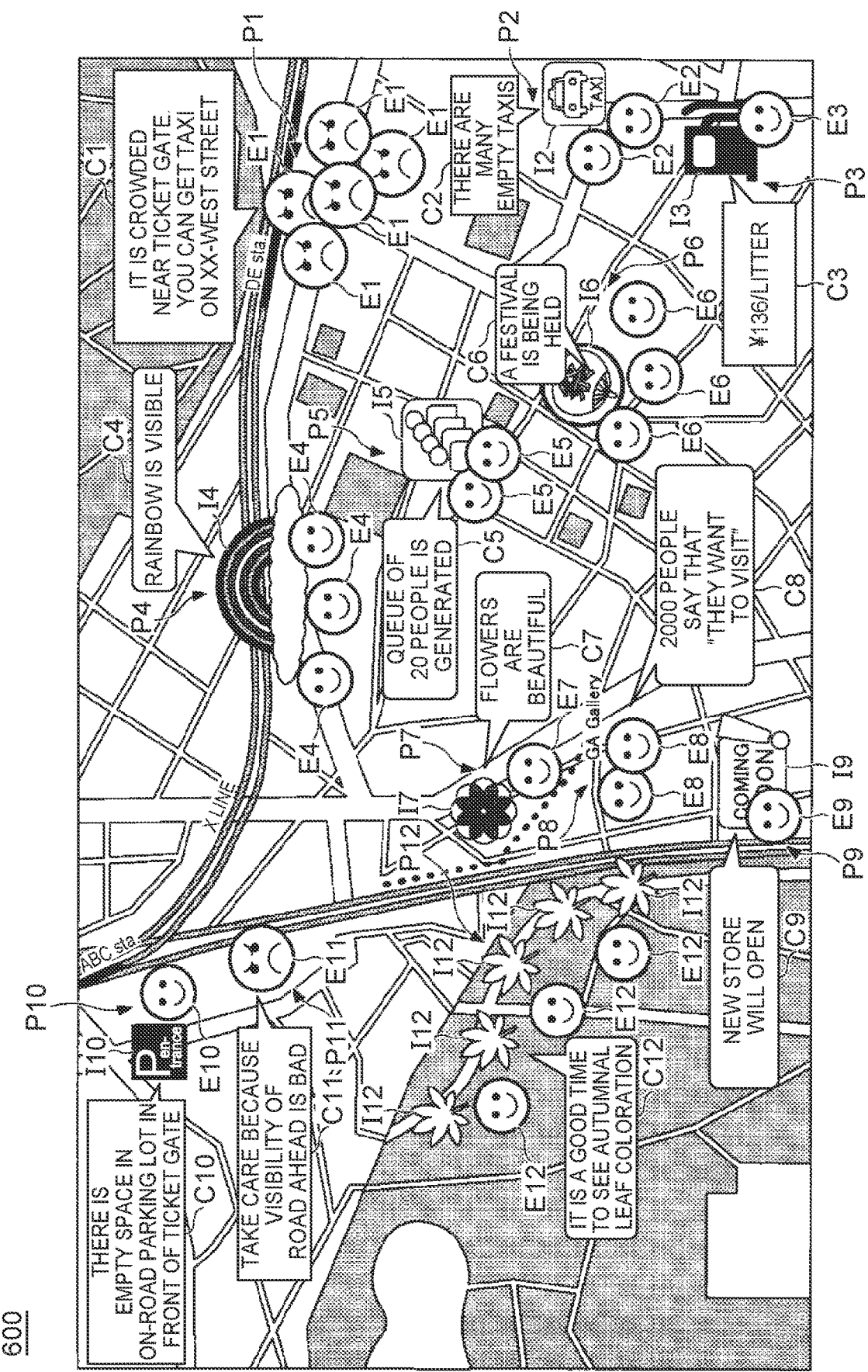
FIG. 6 is a diagram showing an example of a composite map image displayed on the display of a mobile terminal.

FIG. 6 is a diagram showing an example of a composite map image (composite map image 600).

As shown in FIG. 6, the composite map image 600 includes the comments C1 to C12 as an example of the event/situation information and the feeling marks E1 to E12 as an example of the feeling summarized information, corresponding to the predetermined position ranges P1 to P12 in the area of the base map image. By using them, it is possible to provide the user of the mobile terminal 4 with the event/situation information and the feeling summarized information on a certain position (position range P1 to P 12).

Each of the feeling marks E1 to E12 is a face icon schematically showing the facial expression of a person.

The feeling marks E1 to E12 include the smile icons (e.g., feeling marks E2 to E10, E12) corresponding to the positive feeling related to the feeling tendency information and the angry face icons corresponding to the negative feeling related to the feeling tendency information (e.g., feeling marks E1, E12).

In addition, the number of feeling marks E1 to E12 corresponding to the respective position ranges P1 to P12 is different. For example, the number of each of the feeling marks E1 to E12 may correspond to the information on the magnitude of feeling included in the feeling summarized information (more specifically, as described above, the total number of pieces of SNS posted information corresponding to positive feeling or negative feeling). That is, as the number of feeling marks E1 to E12 increases, it indicates that many people have positive feeling or negative feeling corresponding to face icons with respect to the positions.

Although the feeling summarized information (more specifically, the feeling tendency information and the feeling magnitude information) is represented by the feeling marks E1 to E12 in this embodiment, the feeling summarized information may be represented by another method, for example, in the so-called heat map form. In this case, the positive feeling and the negative feeling in the feeling tendency information can be represented by different colors and the information on the feeling magnitude can be represented by the shade of color.

In addition, as the auxiliary information corresponding each of the position ranges P2 to P10 and P12, the composite map image 600 includes the icons I2 to I10 and I12 related to an event, a situation, or a POI (shop, facility, etc.) in the target position range. Therefore, the user can immediately and easily understand the event or the situation at the position corresponding to the event/situation information and the corresponding POI at the position.

Although the comments C1 to C12 and the feeling marks E1 to E12 are superimposed and displayed on the map image as the event/situation information and the feeling summarized information in this example, the other information concerning an event, a situation, and a feeling may be further provided in response to an operation of the user. For example, when a touch operation is performed near the position ranges P1 to P12 of the display 45, a captured image corresponding to an event or a situation in the position range P1 to P12, that is, a captured image captured by the vehicle 3, may be superimposed and displayed on the composite map image. This allows the user to understand the specific state of the position ranges P1 to P12. Furthermore, when a touch operation is performed near the position range P1 to P12 of the display 45, the information on the POIs in the position ranges P1 to P12 (for example, detailed information, advertisement information, etc.) may be superimposed and displayed on the composite map image. This allows the user to easily understand the information on the POI corresponding to the displayed event/situation information and the feeling summarized information.

The specific contents of the comments C1 to C12, feeling marks E1 to E12, and icons I2 to I10 and I12 will be described below for each of position ranges P1 to P12.

First, the position range P1 in the upper right portion of the composite map image 600, more specifically, the position range P1 around a certain station, will be described.

At the position near the position range P1 on the map image, the comment C1 and the feeling marks E1 corresponding to the position range P1 are displayed.

The comment C1 includes the character information on an event concerning the position range P1 indicating that it is crowded near the ticket gate of the station corresponding to the position range P1, that is, the train which can be ridden at the station is crowded. In addition, the comment C1 includes the character information on an event at another position related to the event in the position range P1, indicating that a taxi can be gotten when the user moves to the position range P2 that will be described later. In this way, not only the information on the event relating to a certain position, but also the information on an event at another position regarding the event is provided to the user. This allows the user to take an action on an event with respect to another position, improving the user's convenience.

The feeling mark E1 is an angry face icon corresponding to a negative feeling. Thus, the user can understand that the events in the position range P1, that is, the negative feelings (e.g., anger, sadness, etc.) about the congestion of the station are dominant for people around the position range P1.

In addition, five feeling marks E1 are displayed at the position range P1. This allows the user to understand that the magnitude of negative feeling is very large, that is, a very large number of people have negative feeling against the congestion of the station.

For the position range P1, the station is explicitly displayed in the base map image and, in addition, the congestion can be understood by the contents of the comment C1. Therefore, though the icons concerning the event, the situation, and the POI are not shown, the icon of the station and the icon indicating congestion may be displayed. The same applies to the position ranges P7 and P11 that will be described later.

Next, the position range P2 in the lower right portion of the composite map image 600, more specifically, the position range P2 around the roadside along a certain street will be described.

At the position near the position range P2 in the map image, the comment C2 and feeling mark E2 corresponding to the position range P2 are displayed.

The comment C2 includes the character information on the situation concerning the position range P2 (occupied/unoccupied state of a taxi) indicating that there are a lot of unoccupied taxis. This allows the user to understand that the user can get a taxi in the position range P2.

The feeling mark E2 is a smile icon corresponding to positive feeling. This allows the user to understand that the positive feeling (for example, relief, etc.) is dominant in the people in the vicinity of the position range P2 for the event in the position range P2, that is, for the fact that there are many unoccupied taxis Two feeling marks E2 are displayed in the position range P2. This allows the user to understand that some people have a positive feeling about a lot of unoccupied taxis.

In the vicinity of the position range P2 in the map image, the icon I2 indicating the situation in the position range P2, that is, the icon schematically showing the occupied/unoccupied state of taxis, is displayed. This allows the user to immediately understand that the event/situation information (comment C2) displayed in the position range P2 is the information on a taxi.

Next, the position range P3 adjacent below the position range P2 in the composite map image 600, more specifically, the position range P3 around the gas station in a certain street, will be described.

In the vicinity of the position range P3 in the map image, the comment C3 corresponding to the position range P3 and the feeling mark E3 are displayed.

The comment C3 includes the character information on the event and the situation (situation of change in the store-front display price, etc.) concerning the position range P3 indicating that the store-front price at the gas station corresponding to the position range P3 is 136 yen per liter.

The feeling mark E3 is a smile icon corresponding to positive feeling. This allows the user to understand that, for the people in the vicinity of the position range P3, the positive feeling is dominant for the event or the situation, that is, for the store-front price at the gas station, in the position range P3 (for example, the people are happy because the price is cheaper than that of a gas station near to the position range or that the price is cheaper than the previous price of the same gas station). That is, the user recognizes the character information indicated by the comment C3, as well as the feeling mark E3, to understand that the store-front price of the gas station is relatively cheap. In other words, it is difficult to determine whether only the information about the store-front price at the gas station leads to the positive feeling or to the negative feeling. Therefore, in this case, the feeling summarized information (feeling mark E3), if displayed in conjunction with the information on the store-front price, helps the user understand the event or the situation.

In addition, one feeling mark E3 is displayed in the position range P3. This allows the user to understand that a certain number of people have positive feeling for the store-front price of the gas station.

In the vicinity of the position range P3 in the map image, the POI of the position range P3, that is, the icon indicating a gas station is indicated. This allows the user to immediately understand that the POI at the position corresponding to the comment C3 and the feeling mark E3 is a gas station.

Next, the position range P4 in the upper portion at the center of the composite map image 600 will be described.

In the vicinity of the position range P4 in the map image, the comment C4 and the feeling mark E4 corresponding to the position range P4 are displayed.

The comment C4 includes the character information on the event concerning the position range P4 indicating that a rainbow is visible. This allows the user to understand that the rainbow can be seen if the user moves to a position around the position range P4.

The feeling mark E4 is a smile icon corresponding to positive feeling. This allows the user to understand that, for the people in the vicinity of the position range P4, the positive feeling is dominant for the event, that is, for the generation of the rainbow (for example, pretty, beautiful, etc.), in the position range P4. The user can also understand, through the feeling mark E4 (feeling summarized information), the specific situation of the event at that position, that is, understand indirectly that the rainbow is relatively clean or clearly visible.

Three feeling marks E4 are displayed in the position range P4. This allows the user to understand that relatively many people have positive feeling for the rainbow.

In the vicinity of the position range P4 in the map image, the icon I4 schematically showing the event in the position range P4, that is, the generated rainbow, is displayed. This allows the user to immediately understand that the event/situation information (comment C4) displayed in the position range P4 is the information on the rainbow.

Next, the position range P5 adjacent to the lower right of the position range P4 in the composite map image 600, more specifically, the position range P5 around the stores in the back-alley area (buildings in the densely-built area), will be described.

In the vicinity of the position range P5 in the map image, the comment C5 and the feeling marks E5 corresponding to the position range P5 are displayed.

The comment C5 includes the character information on the event and the situation, related to the position range P5, indicating that a queue of 20 people is generated in front of the store.

The feeling mark E5 is a smile icon corresponding to positive feeling. This allows the user to understand that, for the people in the vicinity of the position range P5 (typically, the people in the queue), the positive feeling (pleasure to know that the turn has come or the store has opened) is dominant for the event and its situation in the position range P5, that is, for the queue and its situation. In other words, it is difficult for the user to understand what queue it is or whether the situation is good, based only on the event/situation information on the generation of the queue and its situation. Therefore, in this case, the feeling information, if displayed in conjunction with the information, helps the user understand that the queue leads to people's positive feeling.

Two feeling marks E5 are displayed in the position range P5. This allows the user to understand that some people have positive feeling for the queue.

In the vicinity of the position range P5 in the map image, the icon I5 schematically showing the event in the position range P5, that is, the generated queue, is displayed. This allows the user to immediately understand that the event/situation information (comment C5) displayed in the position range P5 is the information on the queue.

Next, the position range P6 adjacent to the lower right of the position range P5 in the composite map image 600, more specifically, the position range P6 in the back-alley area, will be described.

The comment C6 and the feeling mark E6 corresponding to the position range P6 are displayed in the vicinity of the position range P6 in the map image.

The comment C6 includes the character information on the event concerning the position range P6 indicating that a festival is being held.

The feeling mark E6 is a smile icon corresponding to positive feeling. This allows the user to understand that, for the people in the vicinity of the position range P6, the positive feeling is dominant for the event in the position range P6, that is, for the holding of the festival.

Three feeling marks E6 are displayed in the position range P6. This allows the user to understand that relatively many people have positive feeling for the festival that is being held.

In the vicinity of the position range P6 in the map image, the icon I6 schematically showing the event in the position range P6, that is, the festival being held, is displayed. This allows the user to immediately understand that the event/situation information (comment C6) displayed in the position range P6 is the information on the festival.

Next, the position range P7 adjacent to the lower left of the position range P4 in the composite map image 600 will be described.

The comment C7 and the feeling mark E7 corresponding to the position range P7 are displayed in the vicinity of the position range P7 in the map image.

The comment C7 includes the character information on the situation of the position range P7 indicating that the flowers in the flowerbed or the flower shop are beautiful.

The feeling mark E7 is a smile icon corresponding to positive feeling. This allows the user to understand that, for the people in the vicinity of the position range P7, the positive feeling is dominant for the situation in the position range P7, that is, for the beautiful flowers.

One feeling mark E7 is displayed in the position range P7. This allows the user to understand that relatively many people have positive feeling for the flowers.

Next, the position range P8 adjacent below the position range P7 in the composite map image 600, more specifically, the position range P8 in the vicinity of the museum gallery will be described.

The comment C8 and the feeling mark E8 corresponding to the position range P8 are displayed in the vicinity of the position range P8 in the map image.

The comment C8 includes the character information on the event and the situation concerning the position range P8 indicating that an exhibition is being held at the museum gallery and that 2000 people post on the SNS that they want to visit the gallery to see the exhibition (that is, many people are interested in the exhibition).

The feeling mark E8 is a smile icon corresponding to positive feeling. This allows the user to understand that, for the people in the vicinity of the position range P8 (typically, those who have visited the museum gallery), the positive feeling is dominant for the event in the position range P8 (that is, for the exhibition at the museum gallery). That is, the user can understand that the exhibition receives favorable comments.

Two feeling marks E8 are displayed in the position range P8. This allows the user to understand that relatively many people have positive feeling for the exhibition at the museum gallery.

Next, the position range P9 adjacent below the position range P8 in the composite map image 600, more specifically, the position range P9 in the vicinity of the store that is located along the main road and will open in the near future (new store), will be described.

The comment C9 and the feeling mark E9 corresponding to the position range P9 are displayed in the vicinity of the position range P9 in the map image.

The comment C9 includes the character information on the situation of the position range P9 indicating that the new store will open.

The feeling mark E9 is a smile icon corresponding to positive feeling. This allows the user to understand that, for the people in the vicinity of the position range P9, the positive feeling is dominant for the situation in the position range P9, that is, for the situation in which the new store will open (for example, the people are looking forward the opening of the new store).

One feeling mark E9 is displayed in the position range P9. This allows the user to understand that relatively many people are looking forward to the situation in the position range P9, that is, for the opening of the new store.

In the vicinity of the position range P9 in the map image, the icon I9 schematically showing the situation in the position range P9, that is, the opening of the new store, is displayed in the superimposition mode. This allows the user to immediately understand that the event/situation information (comment C9) is the information on the new store that will open.

Next, the position range P10 in the upper left portion of the composite map image 600, more specifically, the position range P10 in the vicinity of the on-road parking lot in front of a station, will be described.

The comment C10 and the feeling mark E10 are displayed in the vicinity of the position range P10 in the map image.

The comment C10 includes the character information on the situation of the position range P10 indicating that there is an empty space in the parking lot in front of the ticket gate of the station.

The feeling mark E10 is a smile icon corresponding to positive feeling. This allows the user to understand that, for the people in the vicinity of the position range P10, the positive feeling is dominant for the situation in the position range P10, that is, for the situation in which there is an empty space in the on-road parking lot (for example, a relief given by the information indicating that there is an empty space).

One feeling mark E10 is displayed in the position range P10. This allows the user to understand that relatively many people feel relieved about the situation of the position range P10, that is, about the situation in which there is an empty space in the on-road parking lot.

In the vicinity of the position range P10 in the map image, the POI of the position range P10, that is, the icon I10 schematically showing a parking lot such as an on-road parking lot is displayed. This allows the user to immediately understand that the event/situation information (comment C10) on the position range P10 is the information on a parking lot such as an on-road parking lot.

Next, the position range P11 adjacent below the position range P10 in the composite map image 600, more specifically, the position range P11 in the vicinity of a certain road, will be described.

The comment C11 and the feeling mark E11 corresponding to the position range P11 are displayed in the vicinity of the position range P11 in the map image.

The comment C11 includes the character information on the situation of the position range P11 indicating that the visibility of the road ahead is bad. This allows the user to understand that the visibility of the road ahead is bad and that, when traveling on this road, care must be taken.

The feeling mark E11 is an angry-face icon corresponding to negative feeling. This allows the user to understand that, for the people in the vicinity of the position range P11, the negative feeling is dominant for the situation in the position range P11, that is, for the situation in which the visibility of the road is bad (for example, the user feels scared when traveling on the road).

One feeling mark E11 is displayed in the position range P11. This allows the user to understand that relatively many people feel uncomfortable about the situation of the position range P11, that is, about the situation in which the visibility of the road is bad.

Next, the position range P12 in the lower left of the composite map image 600, more specifically, the position range P12 corresponding to the forest area including hardwoods, will be described.

The comment C12 and the feeling mark E12 corresponding to the position range P12 are displayed in the vicinity of the position range P12 in the map image.

The comment C12 includes the character information on the situation of the position range P12 indicating that it is a good time to see the autumnal leaf coloration in the forest area.

The feeling mark E12 is a smile icon corresponding to positive feeling. This allows the user to understand that, for the people in the vicinity of the position range P12, the positive feeling is dominant for the situation in the position range P12, that is, for the situation of the hardwood leaf coloration status. In other words, the user can indirectly understand that it is a good time for seeing the autumnal leaf coloration.

Three feeling marks E12 are displayed in the position range P12. This allows the user to understand that relatively many people have the positive feeling about the autumnal leaf coloration status of the forest area.

In the vicinity of the position range P12 in the map image, the icons I12 indicating the situation in the position range P12, that is, the icon schematically showing the hardwood leaf coloration status (typically, maple), are displayed. This allows the user to immediately understand that the event/situation information (comment C12), displayed in the position range P12, is the information on the hardwood leaf coloration status (maple), that is, the information on the autumnal leaf coloration status. In addition, a plurality (five in this example) of icons I12 are displayed over the forest area (position range P12) that has a certain width. This allows the user to immediately understand that the position range P12 extends over a somewhat wide range.

In this example, not only the comments displayed as the event/situation information but also the feeling summarized information indicated by the icon, the information on the POI, and the information on the event/situation are displayed in the map image in the superimposition mode. Therefore, the information providing system 1 further helps the user understand the events and situations in the area included in the map image, thereby allowing the user to select an action from many possible actions.

[Operation]

As described above, the probe information accumulation processing unit 5202 collects the sensing information, acquired by the vehicle 3 at an arbitrary position, from the vehicle 3 in this embodiment. Then, the information delivery unit 5209 causes the display 45 of the mobile terminal 4 to display the map image. At the same time, at the corresponding position in the map image, the information delivery unit 5209 causes the display 45 to display the information included in the sensing information, acquired by the vehicle 3, and in the feeling information (SNS posted information) about the acquisition position where the sensing information was acquired by the vehicle 3.

As a result, in addition to the feeling information that is subjective information collected from the web, the sensing information is collected from the vehicle 3 (probe) as the information related to an event or a situation at an arbitrary position. The sensing information can be acquired in various places and from a large number of vehicles 3 as the vehicle 3 moves, irrespective of the intention of the occupant of the vehicle 3. Therefore, the center server 5 collects a wide range of sensing information related to the events and situations at various positions in the real world and, then, causes the display 45 to display the contents of the collected sensing information, together with the feeling information corresponding to the acquisition positions of the sensing information, at the corresponding positions in the map image and, thereby, provides their contents to the user.

In addition, in the present embodiment, the information delivery unit 5209 causes the display 45 to display the information included in the feeling information (SNS posted information) within a predetermined time, including the time at which the sensing information was acquired by the vehicle 3, at the corresponding position in the map image.

As a result, the information that is included in the SNS posted information related to the acquisition position of the sensing information and that is included in the SNS posted information in the time zone around the acquisition time is displayed on the display 45 of the mobile terminal 4. Therefore, the center server 5 can appropriately display the information, included in the SNS posted information corresponding to an event and a situation at the acquisition time, and at the acquisition position, of the sensing information, in the map image of the display 45 of the mobile terminal 4.

In this embodiment, the information delivery unit 5209 displays the information, included in the sensing information acquired within the latest predetermined time, at the corresponding position in the map image.

As a result, the center server 5 can cause the display 45 of the mobile terminal 4 to display the information included in the sensing information that is collected within the latest predetermined time and is relatively new (that is, real-time information).

Also, in this embodiment, the sensing information analysis unit 5204 determines an event or a situation around the acquisition position where the sensing information was acquired by the vehicle 3, based on the sensing information collected by the probe information accumulation processing unit 5202. Then, as the information included in the sensing information, the information delivery unit 5209 causes the display 45 to display the information (event/situation information) on an event or a situation at the corresponding position in the map image.

As a result, the center server 5 can determine an event or a situation around the acquisition position based on the sensing information and, actually, causes the display 45 of the mobile terminal 4 to display the event or the situation around the acquisition position of the sensing information.

In addition, in this embodiment, based on the SNS posted information that is collected by the SNS crawler unit 5203 and is related to a common position, the SNS information analysis unit 5205 determines the feeling tendency that includes dominance between the positive information and the negative information indicated by the SNS posted information. Then, the information delivery unit 5209 causes the display 45 to display the information on the feeling tendency (feeling tendency information) at the corresponding position in the map image as the information included in the SNS posted information.

As a result, based on the SNS posted information on the common position, the center server 5 can determine which feeling, positive or negative, is more dominant for the position and then causes the display 45 of the mobile terminal 4 to display this feeling tendency.

In addition, the sensing information includes a captured image, acquired by capturing the surroundings of the vehicle 3, in this embodiment.

As a result, the center server 5 can specifically determine various events and situations around the acquisition position of the captured image by performing known image recognition processing for the captured image and, then, cause the display 45 of the mobile terminal 4 to display the resulting image.

In addition, the SNS crawler unit 5203 collects the SNS posted information, which is output on the SNS, as the feeling information in this embodiment.

As a result, the center server 5 can collect the information on the acquisition position of the sensing information from among a large number of pieces of SNS posted information output on the SNS. Therefore, the center server 5 can extensively collect SNS posted information on various positions and provide the collected information to the user.

Although collected only from the SNS in this embodiment, the feeling information may be collected from various types of posted information that is output to the web including the SNS.

In this embodiment, the information delivery unit 5209 changes the area, included in the map image displayed on the display 45 of the mobile terminal 4, according to the type of user's movement means of the mobile terminal 4 acquired by the user related information acquisition unit 5207.

As a result, though the movement distance assumed for the user can vary depending on the movement means, the center server 5 can change the size of an area to be displayed in the map image in accordance with the assumed movement distance (movable range). Therefore, the center server 5 can provide the user with the information included in each of the sensing information and the SNS posted information regarding a position where the user can actually move.

Furthermore, in this embodiment, the information delivery unit 5209 may change an area to be included in the map image displayed on the display 45, based on the destination of the user of the mobile terminal 4.

As a result, the center server 5 can display the map image of an area nearer to the direction of movement from the current position to the destination to which the user is traveling, or can reduce the scale of the map image when the distance to the destination is relatively long. Therefore, the center server 5 can provide the user with the information included in each of the sensing information and the SNS posted information on the position of the travel route to the destination to which the user is traveling.

In addition, in this embodiment, from the current position of the user of the mobile terminal 4 to the destination, the waypoint recommendation unit 5208 determines a recommended waypoint from among the positions that are related to the information included in each of the sensing information and the SNS posted information displayed in the map image on the display 45 by the information delivery unit 5209. Then, the information delivery unit 5209 causes the route point, recommended by the waypoint recommendation unit 5208, to be displayed in the map image.

As a result, from the current position of the user to the destination, the center server 5 can recommend a position, for which information indicating positive feeling is included in the SNS posted information, to the user as a waypoint, from among the positions that are related to the information to be displayed in the map image (information included in each of the sensing information and the SNS posted information).

In addition, in this embodiment, the user related information acquisition unit 5207 acquires characteristic information (preference characteristic information) on the user's preference. Then, based on the acquired preference characteristic information, the waypoint recommendation unit 5208 may determine a waypoint.

As a result, the center server 5 can recommend a position, such as the position of a facility, a shop, and so on, that matches the user's preference as a waypoint according to the preference of the user of the mobile terminal 4.

In addition, in this embodiment, the user related information acquisition unit 5207 acquires the user's schedule information. Then, from the current position of the user to the destination corresponding to the next schedule determined based on the schedule information, the waypoint recommendation unit 5208 determines a waypoint based on the free time to the next schedule.

As a result, the center server 5 can cooperate with a schedule application, such as the one provided for the mobile terminal 4, to acquire the user's schedule information and, from the current position to the destination determined by the next schedule, recommends a waypoint that matches the free time.

Although the embodiments for carrying out the present disclosure have been described in detail above, the present disclosure is not limited to the specific embodiments described above, and various modifications and changes may be made within the scope of the spirit described in claims.

For example, though the center server 5 performs the service of delivering a composite map image to the mobile terminal 4 in this embodiment, the composite map image may be delivered to a vehicle, more specifically, to the in-vehicle device mounted on the vehicle. As a result, the in-vehicle device in the vehicle can display the composite map image on a device such as a display mounted on the vehicle, meaning that the information similar to that provided to the user of the mobile terminal 4 described above may be provided also to the user of the vehicle to which the composite map image is delivered (target vehicle). In this case, the target vehicle may be the vehicle 3 that functions as the probe described above or may be a vehicle other than the vehicle 3.

What is claimed is:

1. An information providing system comprising a circuitry configured to:
    collect, via a first network, sensing information from a vehicle, the sensing information being acquired at an arbitrary position by the vehicle;
    collect, via a second network, feeling information from a social networking service, the feeling information indicating a people's feeling about an arbitrary position;
    cause a display mounted on a mobile terminal or a target vehicle to display a map image and to display each of at least a part of the sensing information and at least a part of the feeling information at a corresponding position in the map image, the feeling information being related to an acquisition position at which the sensing information was acquired by the vehicle;
    determine, from a current position of a user of the mobile terminal or the target vehicle to a destination, a recommended waypoint from among positions related to information included in at least one of the sensing information and the feeling information displayed in the map image,
    display the recommended waypoint in the map image;
    acquire schedule information on the user; and
    determine the recommended waypoint, from the current position of the user to a destination corresponding to a next schedule determined based on the schedule information, based on a free time to the next schedule.

2. The information providing system according to claim 1, wherein
    the circuitry is configured to display extracted feeling information at a corresponding position in the map image, the extracted feeling information being included in the feeling information acquired within a predetermined time from an acquisition time at which the sensing information was acquired by the vehicle.

3. The information providing system according to claim 1, wherein
    the circuitry is configured to display extracted sensing information at a corresponding position in the map image, the extracted sensing information being included in the sensing information acquired within a predetermined time from a current time.

4. The information providing system according to claim 1, wherein
    the circuitry is configured to
        determine an event or a situation around the acquisition position based on the collected sensing information, and
        display situation information at a corresponding position in the map image, the situation information being included in the sensing information and being related with the event or the situation.

5. The information providing system according to claim 1, wherein
    the circuitry is configured to
        determine a feeling tendency including dominance between positive information and negative information indicated by the feeling information, based on the feeling information related to a common position, and display feeling tendency information at a corresponding position in the map image, the feeling tendency information being included in the feeling information.

6. The information providing system according to claim 1, wherein the sensing information includes a captured image generated by capturing surroundings of the vehicle.

7. The information providing system according to claim 1, wherein the circuitry is configured to collect the feeling information by using posted information posted on the social networking service.

8. The information providing system according to claim 1, wherein the circuitry is configured to acquire movement means information related to a movement means of a user who has the mobile terminal, and change an area included in the map image displayed on the display of the mobile terminal, based on a type of the movement means.

9. The information providing system according to claim 1, wherein the circuitry is configured to change an area included in the map image displayed on the display, based on a destination of a user of the mobile terminal or the target vehicle.

10. The information providing system according to claim 1, wherein the circuitry is configured to acquire characteristic information on a preference of the user, and determine the recommended waypoint based on the characteristic information.

11. An information providing method comprising:

(a) collecting, via a first network, sensing information from a vehicle, the sensing information being acquired at an arbitrary position by the vehicle;

(b) collecting, via a second network, feeling information from a social networking service, the feeling information indicating a people's feeling about an arbitrary position; and (c) causing a display mounted on a mobile terminal or a target vehicle to display a map image and to display each of at least a part of the sensing information and at least a part of the feeling information at a corresponding position in the map image, the feeling information being related to an acquisition position at which the sensing information was acquired by the vehicle;

determine, from a current position of a user of the mobile terminal or the target vehicle to a destination, a recommended waypoint from among positions related to information included in at least one of the sensing information and the feeling information displayed in the map image, display the recommended waypoint in the map image;

acquire schedule information on the user; and determine the recommended waypoint, from the current position of the user to a destination corresponding to a next schedule determined based on the schedule information, based on a free time to the next schedule.

12. The information providing method according to claim 11, wherein step (c) includes displaying extracted feeling information at a corresponding position in the map image, the extracted feeling information being included in the feeling information acquired within a predetermined time from an acquisition time at which the sensing information was acquired by the vehicle.

13. The information providing method according to claim 11, wherein step (c) includes displaying extracted sensing information at a corresponding position in the map image, the extracted sensing information being included in the sensing information acquired within a predetermined time from a current time.

14. The information providing method according to claim 11, further comprising:

determining an event or a situation around the acquisition position based on the collected sensing information, and displaying situation information at a corresponding position in the map image, the situation information being included in the sensing information and being related with the event or the situation.

15. The information providing method according to claim 11, further comprising:

determining a feeling tendency including dominance between positive information and negative information indicated by the feeling information, based on the feeling information related to a common position, and displaying feeling tendency information at a corresponding position in the map image, the feeling tendency information being included in the feeling information.

16. The information providing method according to claim 11, wherein the sensing information includes a captured image generated by capturing surroundings of the vehicle.

17. The information providing method according to claim 11, further comprising collecting the feeling information by using posted information posted on the social networking service.

18. A non-transitory recording medium storing a program, the program causing a computer to execute a method including:

collecting, via a first network, sensing information from a vehicle, the sensing information being acquired at an arbitrary position by the vehicle;

collecting, via a second network, feeling information from a social networking service, the feeling information indicating a people's feeling about an arbitrary position; and causing a display mounted on a mobile terminal or a target vehicle to display a map image and to display each of at least a part of the sensing information and at least a part of the feeling information at a corresponding position in the map image, the feeling information being related to an acquisition position at which the sensing information was acquired by the vehicle;

determine, from a current position of a user of the mobile terminal or the target vehicle to a destination, a recommended waypoint from among positions related to information included in at least one of the sensing information and the feeling information displayed in the map image, display the recommended waypoint in the map image;

acquire schedule information on the user; and determine the recommended waypoint, from the current position of the user to a destination corresponding to a next schedule determined based on the schedule information, based on a free time to the next schedule.

* * * * *